United States Patent
Rini et al.

(10) Patent No.: US 7,056,478 B1
(45) Date of Patent: Jun. 6, 2006

(54) EMISSION TREATMENT SYSTEM

(75) Inventors: Michael J. Rini, Knoxville, TN (US); Mou Jian, Knoxville, TN (US); Thomas S. Raines, Knoxville, TN (US); Marie L. Aumaugher, Oak Ridge, TN (US); Noel C. Kuck, Oak Ridge, TN (US); Arlyn V. Petig, Knoxville, TN (US); David K. Anderson, East Longmeadow, MA (US); Frederic Kozak, Knoxville, TN (US); Keri N. Cochran, Knoxville, TN (US); James A. Yann, Knoxville, TN (US); Tom C. Lillestolen, Lenoir City, TN (US); Robert G. Hilton, Knoxville, TN (US)

(73) Assignee: ALSTOM Technology LTD, Baden (CH)

( * ) Notice: Subject to any disclaimer, the term of this patent is extended or adjusted under 35 U.S.C. 154(b) by 518 days.

(21) Appl. No.: 10/305,677

(22) Filed: Nov. 26, 2002

(51) Int. Cl.
*B32B 27/02* (2006.01)

(52) U.S. Cl. .................... 422/171; 422/173; 423/239.1

(58) Field of Classification Search ................ 422/171, 422/168, 172, 178; 423/235, 239
See application file for complete search history.

(56) References Cited

U.S. PATENT DOCUMENTS

| | | | |
|---|---|---|---|
| 4,353,207 A | 10/1982 | Lee | |
| 4,919,170 A | 4/1990 | Kallinich et al. | |
| 5,078,973 A * | 1/1992 | Kuroda et al. | ............... 422/171 |
| 5,224,334 A | 7/1993 | Bell | |
| 5,603,909 A | 2/1997 | Varner et al. | |
| 5,775,266 A | 7/1998 | Ziegler | |
| 5,988,115 A * | 11/1999 | Anderson et al. | ........... 122/4 D |
| 6,086,241 A | 7/2000 | Herr et al. | |
| 6,257,155 B1 | 7/2001 | Greene | |

FOREIGN PATENT DOCUMENTS

DE 37 05 705 1/1988
EP 583771 A1 * 2/1994

OTHER PUBLICATIONS

PCT International Search Report dated Mar. 24, 2004—(PCT/US03/33835).

* cited by examiner

*Primary Examiner*—Glenn Caldarola
*Assistant Examiner*—Tom Duong
(74) *Attorney, Agent, or Firm*—Arthur E. Fournier, Jr.; Timothy J. Olson (57) ABSTRACT

An emission treatment system for removing $NO_x$ from flue gas includes a diversion member that closes the stack at a position intermediate the inlet and outlet ends. A major component module includes a first sub-module, having an inlet and an SCR segment, a second sub-module, having a heat exchange segment, and a third sub-module, having an ID fan and an outlet, forming a flue gas flow path extending from the inlet to the outlet. Inlet ductwork, which is in fluid communication with the stack at a position intermediate the inlet end of the stack and the diversion member, provides a passageway from the stack to the inlet. Outlet ductwork, which is in fluid communication with the stack at a position intermediate the diversion member and the outlet end of the stack, provides a passageway from the outlet to the stack. An ammonia addition subsystem injects ammonia vapor into the inlet ductwork.

27 Claims, 10 Drawing Sheets

EMISSION TREATMENT SYSTEM

BACKGROUND OF THE INVENTION

This invention relates generally to processes and apparatus for the removal of nitrogen oxides or "$NO_x$" (principally nitric oxide (NO) and nitrogen dioxide ($NO_2$)) from exhaust gases and the like. More particularly, the present invention relates to processes and apparatus for reducing $NO_x$ selectively from exhaust gases produced during petroleum refining, petrochemical production and also to industrial processes producing exhaust gases containing $NO_x$.

Carbonaceous fuels are burned in internal combustion engines and in a wide variety of industrial process (i.e. boilers, furnaces, heaters and incinerators, petroleum refining, petrochemical production, and the like).

Excess air frequently is used to complete the oxidation of combustion byproducts such as carbon monoxide (CO), hydrocarbons and soot. Free radicals of nitrogen ($N_2$) and oxygen ($O_2$) combine chemically to form $NO_x$, primarily NO, at high combustion temperatures. This thermal $NO_x$ tends to form even when nitrogen is not present in the fuel. Combustion modifications which decrease the formation of thermal $NO_x$ generally are limited by the generation of objectionable byproducts or deteriorating flame properties.

When discharged to the air, NO emissions oxidize to form $NO_2$, which in the presence of sunlight reacts with volatile organic compounds to form ground level ozone, eye irritants and photochemical smog. Despite advancements in fuel and combustion technology, ground level ozone concentrations still exceed federal guidelines in many urban regions. Under the Clean Air Act and its amendments, these ozone non-attainment areas must implement stringent $NO_x$ emissions regulations. Such regulations require low $NO_x$ emissions levels that are attained only by exhaust after-treatment. When an exhaust after-treatment system is applied to a refinery or petrochemical plant, it is particularly important to minimize any impact on the operation of the underlying refining or petrochemical process.

Exhaust after-treatment techniques tend to reduce $NO_x$ using various chemical or catalytic methods. Such methods are known in the art and involve non-selective catalytic reduction (NSCR), selective catalytic reduction (SCR) or selective noncatalytic reduction (SNCR). Alternatively, NO may be oxidized to $NO_2$ for removal by wet scrubbers. Such after-treatment methods typically require some type of reactant for removal of $NO_x$ emissions.

Wet scrubbing of $NO_2$ produces waste solutions that represent potential sources of water pollution. Wet scrubbers primarily are used for $NO_x$ emissions from nitric acid plants or for concurrent removal of $NO_2$ with sulfur dioxide ($SO_2$). High costs and complexity generally limit scrubber technology to such special applications.

The NSCR method typically uses unburned hydrocarbons and CO to reduce $NO_x$ emissions in the absence of $O_2$. Fuel/air ratios must be controlled carefully to ensure low excess $O_2$. Both reduction and oxidation catalysts are needed to remove emissions of CO and hydrocarbons while also reducing $NO_x$. The cost of removing excess $O_2$ precludes practical applications of NSCR methods to many $O_2$-containing exhaust gases.

Chemical reactions on a solid catalyst surface of commercial SCR systems convert $NO_x$ to $N_2$. These solid catalysts are selective for $NO_x$ removal and do not reduce emissions of CO and unburned hydrocarbons. Large catalyst volumes are normally needed to produce low levels of $NO_x$. The catalyst activity depends on temperature and declines with use. Normal variations in catalyst activity are accommodated only by enlarging the volume of catalyst or limiting the range of combustion operation. Catalysts may require replacement prematurely due to sintering or poisoning when exposed to high levels of temperature or exhaust contaminants.

Commercial SCR systems primarily use ammonia ($NH_3$) as the reductant. Excess $NH_3$ needed to achieve low $NO_x$ levels tends to result in $NH_3$ breakthrough as a byproduct emission. Even under normal operating conditions, SCR systems require a uniform distribution of $NH_3$ relative to $NO_x$ in the exhaust gas. $NO_x$ emissions, however, are frequently distributed nonuniformly, so low levels of both $NO_x$ and $NH_3$ breakthrough may be achieved only by controlling the distribution of injected $NH_3$ or mixing the exhaust to a uniform $NO_x$ level.

SUMMARY OF THE INVENTION

Briefly stated, the invention in a preferred form is an emission treatment system for removing $NO_x$ from flue gas emitted from a vertically extending stack which comprises a diversion member that closes the stack at a position intermediate the inlet and outlet ends. A major component module includes a first sub-module having an inlet and an SCR segment, a second sub-module having a heat exchange segment, and a third sub-module having an ID fan and an outlet. Each of the sub-modules has a size and weight within size and weight limitations of a conventional flat-bed tractor trailer. The second sub-module is mounted between the first and second sub-modules to form a flue gas flow path extending from the inlet of the first sub-module to the outlet of the third sub-module. Inlet ductwork, which is in fluid communication with the stack at a position intermediate the inlet end of the stack and the diversion member, provides a passageway from the stack to the inlet of the first sub-module. Outlet ductwork, which is in fluid communication with the stack at a position intermediate the diversion member and the outlet end of the stack, provides a passageway from the outlet of the third sub-module to the stack. An ammonia addition subsystem injects ammonia vapor into the inlet ductwork.

The diversion member may be either a fixed a blanking member or a moveable bypass flapper. The inlet ductwork includes a horizontal run connected to a vertical run by an elbow. At least one moveable vane may be disposed in the elbow to reduce the pressure drop therethrough.

The ammonia addition subsystem includes an ammonia injection grid disposed within the horizontal run of the inlet ductwork. If the ammonia injection grid is positioned within ten feet of the stack, a mixer or diffuser is not required to ensure sufficient mixing of the ammonia vapor and flue gas. The vapor pressure of the ammonia in the source of ammonia vapor provides the motive force for injecting the ammonia vapor into inlet ductwork. An ammonia vapor pipe provides fluid communication between the source of ammonia vapor and the ammonia injection grid. An ammonia vapor addition controller controls a throttle valve disposed in the ammonia vapor pipe. The ammonia vapor addition controller may receive signals from a flue gas flow sensor and an inlet $NO_x$ detector positioned intermediate the stack and the ammonia injection grid and an outlet $NO_x$ detector positioned intermediate the fan and the stack for controlling the addition of ammonia vapor. Alternatively, the ammonia vapor addition controller may receive signals from an ammonia sensor positioned intermediate the fan and the stack for controlling the addition of ammonia vapor. In another alternative the ammonia vapor addition controller may receive signals from a fuel controller.

The SCR segment includes a housing, a plurality of catalyst units disposed within the housing, and a first flapper having a side edge pivotally mounted to an inner surface of the housing. The first flapper is moveable between open and closed positions, with the first flapper being adjacent to the housing inner surface in the open position and extending over a first half of the catalyst units in the closed position. The SCR segment may also include a second flapper having a side edge pivotally mounted to the housing inner surface. The second flapper is moveable between open and closed positions, with the second flapper being adjacent to the housing inner surface in the open position and extending over the second half of the catalyst units in the closed position. At least one of the catalyst units being composed of materials for selectively catalyzing $NO_x$. In a first alternative, at least one of the catalyst units may be composed of materials for selectively catalyzing pollutants other than $NO_x$. In a second alternative, at least one of the catalyst units is composed of materials for selectively catalyzing $NO_x$ and other pollutants.

The emission treatment system is installed by conducting an initial installation which does not impact operation of the plant. The initial installation includes setting the major components module adjacent to the stack, connecting the inlet and outlet ductwork to the inlet and outlet of the major component module, respectively, and connecting emission treatment system/plant interfaces to the emission treatment system. Final installation is performed by conducting a tie-in outage which includes shutting the plant down, installing the diversion member in the stack, cutting flue gas take-off and return openings in the stack and connecting the inlet and outlet ductwork thereto, and connecting emission treatment system/plant interfaces to the plant.

Before the initial installation, the plant is prepared without impacting operation of the plant by selecting a site for the major component module and installing a foundation at the site. The locations for a flue gas take-off and return openings are determined. The heat exchanger take-off and the heat exchanger return are identified. The ammonia vapor source, the electric power source, and control system interfaces are also identified.

Setting the major components module includes setting a lower sub-module having the outlet and an ID fan on the foundation and bolted to the foundation. A middle sub-module having the heat exchanger segment is set on the lower sub-module, an upper sub-module having the SCR segment and inlet is set on the middle sub-module, and the sub-modules are welded together. To connect the inlet and outlet ductwork, each ductwork is set in place and secured with a support structure.

The emission treatment system/plant interfaces are connected to the emission treatment system by installing an ammonia injection grid within the inlet ductwork and connecting the ammonia injection grid to the ammonia vapor source. An inlet flange is welded to the stack at the location for the flue gas take-off opening and an outlet flange is welded to the stack at the location for the flue gas return opening. Interconnecting piping is run between the heat exchanger segment and the heat exchanger take-off and return and connected to heat exchanger segment. The electric power source and the control system interfaces are also connected.

It is an object of the invention to provide a system for removing $NO_x$ which may be installed in an existing plant with minimal impact on operation of the plant.

It is also an object of the invention to provide a system for removing $NO_x$ which may be expanded during initial installation or at a later date to remove additional pollutants.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

As concern for the environment grows, greater efforts are being undertaken to reduce emissions of known pollutants, such as particulate matter, $NO_x$, $SO_x$, mercury, etc, by the promulgation of more stringent control requirements. For the refinery and petrochemical industries, the first of these more stringent requirements focuses on $NO_x$ reduction.

With reference to the drawings wherein like numerals represent like parts throughout the several figures, an emission treatment system 10 in accordance with the present invention reduces $NO_x$ by SCR technology, provides for future emissions control of other pollutants, and is a stand-alone system that may be installed on the ground along side the existing equipment, or on legs along side the existing equipment, or on top of the existing equipment, thereby reducing the downtime of the refinery or petrochemical production equipment.

Figure 1:
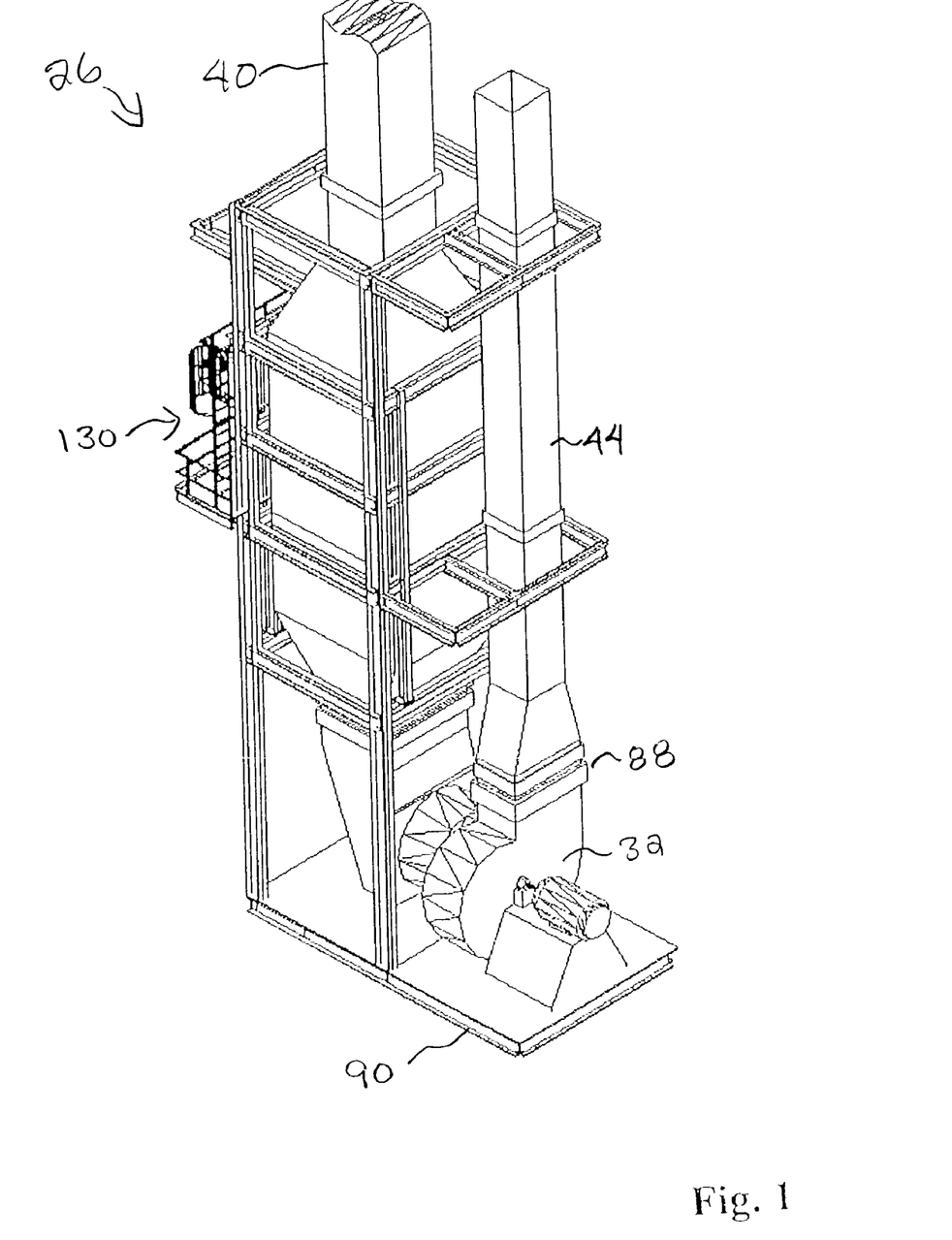
FIG. 1 is a perspective view of an emission treatment system in accordance with the invention.
Figure 2:
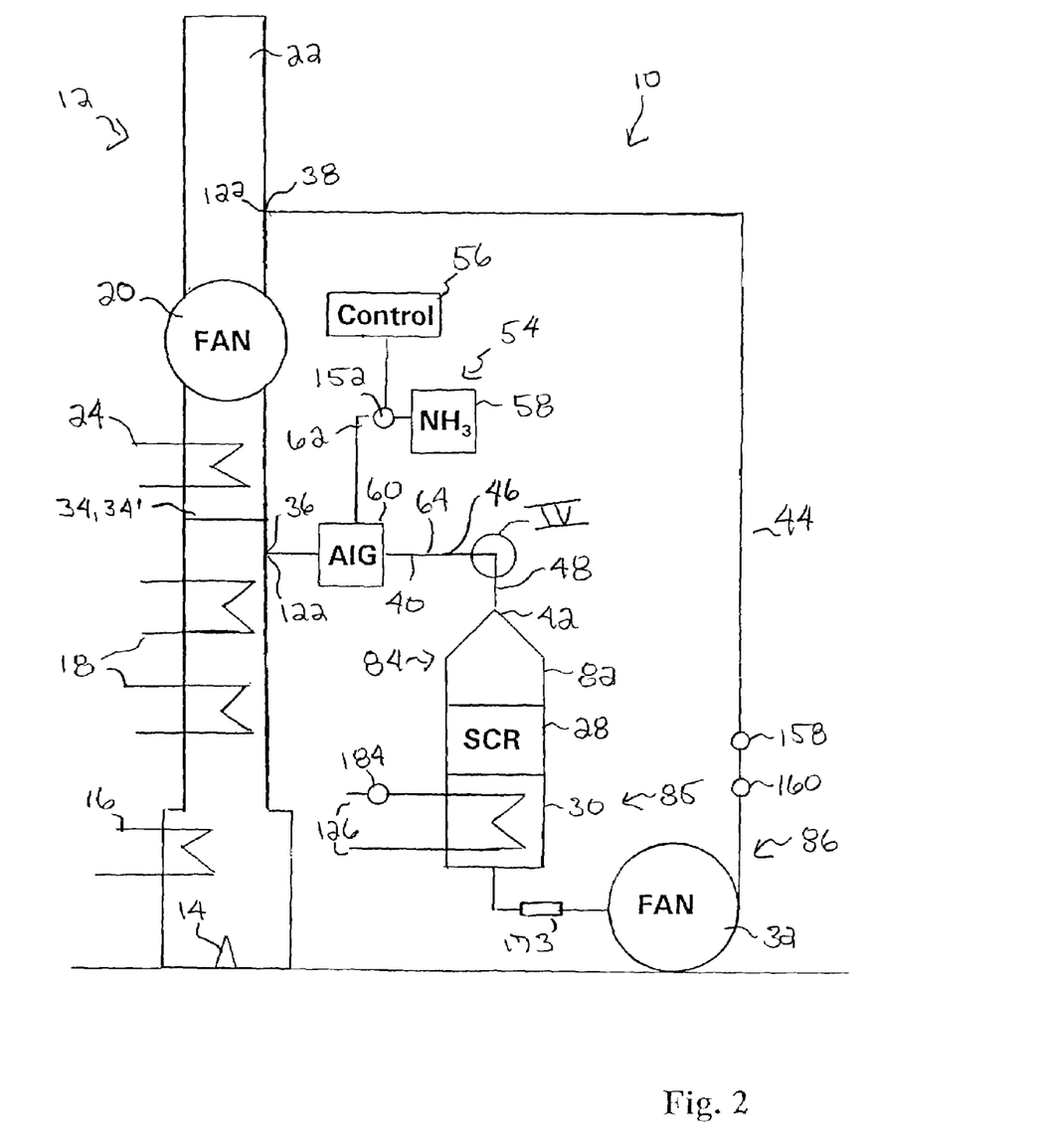
FIG. 2 is a simplified, schematic view, partly in cross section, of the system of FIG. 1 installed on an ethylene heater.

The emission treatment system 10 may be utilized with most refinery and petrochemical production systems. However, for descriptive purposes, the system 10 is described herein installed with an ethylene-cracking furnace 12 (FIG. 2). Fuel is fired by burners 14 located at the bottom or side of the furnace 12 generating high temperature gas and $NO_x$. The "cracking" of hydrocarbon molecules into simpler molecules occurs in a coil 16 in this highest temperature zone.

As the furnace gases pass upward through the furnace, heat is recovered from the flue gas by a series of additional coils 18 which contain either cracking feedstock for preheating or water/steam for use in this process or other processes. Typically, ethylene-cracking furnaces 12 have one or more induced draft (ID) fans 20 located on top of the heater connected by a vertical stack 22. Ethylene-cracking furnaces 12 typically run for several years between significant outages and are a key provider of feedstock for other processes within the refinery or petrochemical plant. Therefore, the downtime to install an SCR is severely limited and costly to the owner.

SCR $NO_x$ removal processes are typically most efficient at temperatures of 500–750° F. Gases at this temperature are typically found just upstream of the ethylene-cracking furnace boiler feedwater heating coil 24 and the ID fan 20. One conventional approach for an SCR retrofit is to shut down the furnace 12, cut into the stack 22 at the appropriate location, lift up the downstream sections and install the SCR. This is much too time consuming to be an economically attractive solution.

The subject emission treatment system 10 includes a stand-alone, modular major component module 26, typically at ground level, that includes an SCR segment 28, a boiler feedwater heat exchange segment 30, and an ID fan 32. By "abandoning" the stack ID fan 20 and the ethylene-cracking furnace boiler feedwater heating coil 24 installed in the stack 22, the emission treatment system 10 is installed without requiring any major modifications to the ethylene-cracking furnace 12. This allows installation of the emission treatment system 10 without significantly interrupting use of the ethylene-cracking furnace 12. The major component module 26 may also be placed on legs above the ground, or even on top of the existing furnace 12, as individual application circumstances may require. The new, system ID fan 32 is sized to provide for the increased draft requirements of the emission treatment system 10, principally for the SCR segment 28. The boiler feedwater heat exchange segment 30 may have higher heat recovery efficiency than the stack boiler feedwater heating coil 24, depending on the design and materials of the stack boiler feedwater heating coil 24, providing an improvement in overall cycle efficiency and/or reduced fuel costs. The stand-alone nature of the system 10 allows for future modification of the SCR segment 28 or the addition of additional segments for emissions control of other pollutants.

Figures 3, 4:
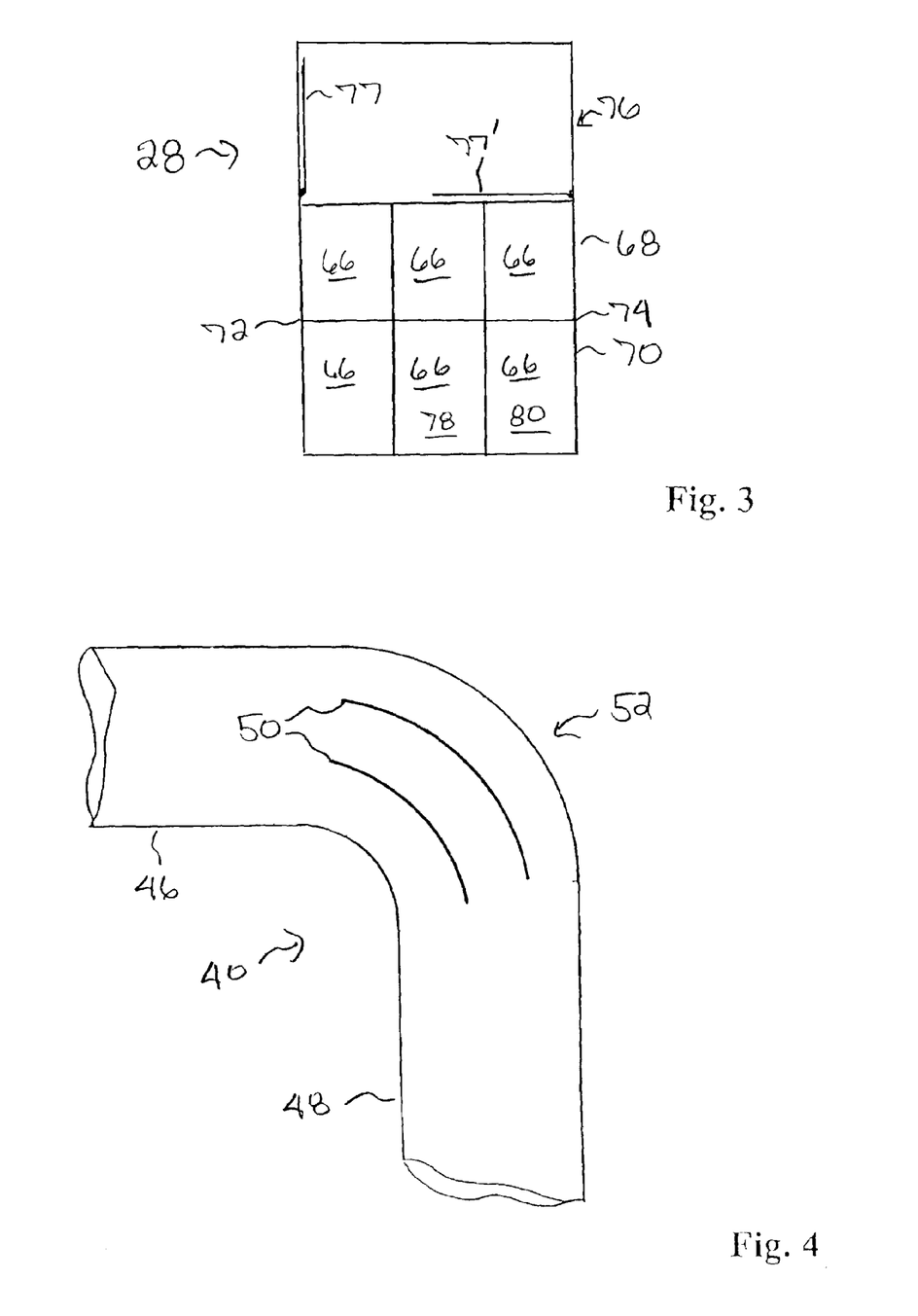
FIG. 3 is an enlarged, schematic, cross section view of the selective catalytic reduction segment of FIG. 2.
FIG. 4 is an enlarged, schematic, cross section view of Area IV of FIG. 2.
Figure 5:
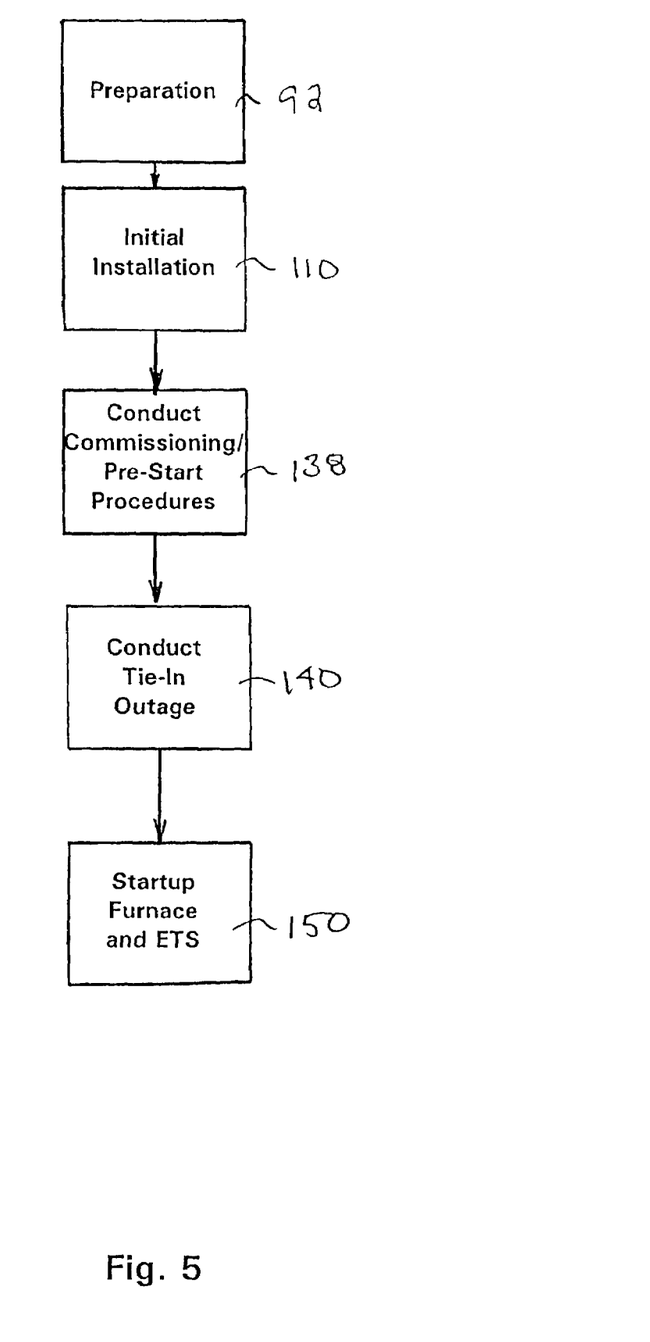
FIG. 5 is a flow diagram of the method of installing the emission treatment system of FIG. 1.
Figure 6:
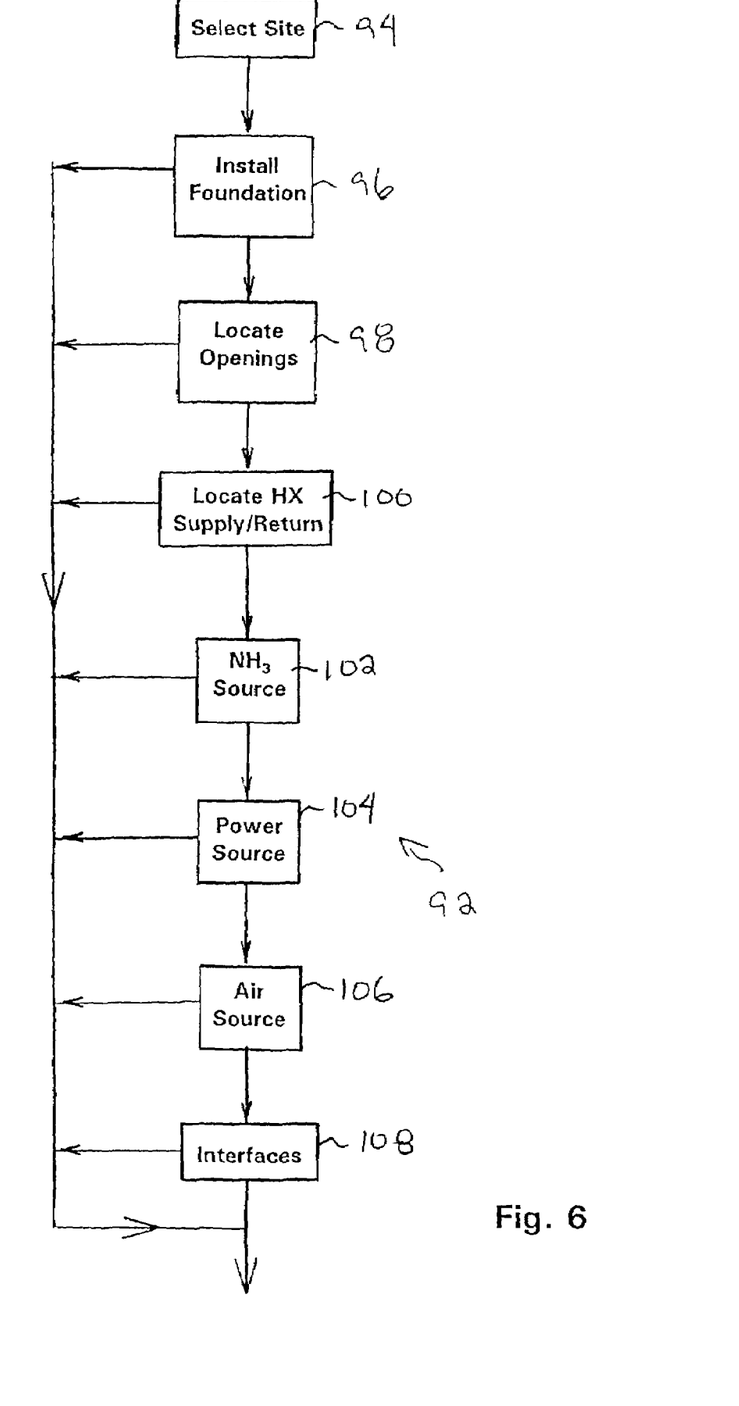
FIG. 6 is a flow diagram of the preparation sub-steps of the method of FIG. 5.

With further reference to FIG. 2, the emission treatment system 10 also includes a blanking member 34 or bypass flapper 34' mounted within the vertical stack 22, just upstream of the ethylene-cracking furnace boiler feedwater heating coil 24. The blanking member 34 is installed across the stack 22 to permanently cutoff all flow through the ethylene-cracking furnace boiler feedwater heating coil 24 and the stack ID fan 20. The bypass flapper 34' is installed across the stack 22 to selectively cutoff all flow through the ethylene-cracking furnace boiler feedwater heating coil 24 and the stack ID fan 20. Flue gas take-off and return openings 36, 38 are formed in the stack 22 just upstream of the blanking member/bypass flapper 34, 34' and just downstream of the stack ID fan 20, respectively. Inlet ductwork 40 connected to flue gas take-off opening 36 and an inlet transition piece 42 in the upper end portion of the major component module 26 and outlet ductwork 44 connected to flue gas return opening 38 and the outlet of system ID fan 32 provide fluid communication between the stack 22 and the major component module 26. The inlet ductwork 40 includes a horizontal run 46 and a vertical run 48, each having a nominal length of thirty (30) feet. Dynamic vanes 50 may be positioned in the elbow 52 between horizontal run 46 and vertical run 48 to reduce the pressure drop through the elbow (FIG. 4).

Conventional utility boiler applications having SCR systems generally use ammonia ($NH_3$) as a reductant and include an ammonia addition system which provides a mixture of ammonia diluted with air or flue gas to uniformly distribute the ammonia across the face of the SCR catalyst, which is located a relatively short distance downstream of the injector. Accordingly, a conventional ammonia addition system consists of a control system, a source of ammonia ($NH_3$) vapor, a static mixer, at least one blower, and an injector which includes multiple spray lines, each having multiple spray nozzles. The ammonia vapor source injects ammonia vapor into the static mixer. Dilution air is blown by the blower(s) into the static mixer to dilute the ammonia vapor and propel the diluted ammonia vapor out of the ammonia addition subsystem via the injector nozzles.

The subject emission treatment system 10 includes an ammonia addition subsystem 54 which takes advantage of the relatively long lengths of the horizontal and vertical runs 46, 48 to provide for proper mixing of the ammonia vapor in the flue gas stream. The ammonia addition subsystem 54 does not include dilution air blowers, blower controls, and the larger diameter diluted ammonia ducting. The ammonia addition subsystem 54 consists of only three major components, a controller 56, a source of ammonia vapor 58, and an ammonia injection grid (AIG) 60. Only a small diameter ammonia vapor pipe 62 is needed. As discussed in greater detail below, the AIG 60 is preferably installed within ten (10) feet of the stack 22. A static mixer/diffuser 64 may be positioned in the horizontal run 46 in the event that the AIG 60 must be located at a significant distance from the stack 22 or to simply provide additional assurance of complete mixing of the ammonia vapor and the flue gas. The inlet transition piece 42 at the entrance to the major components module 26 distributes the ammonia vapor/flue gas mixture evenly across the inlet to the downstream SCR segment 28.

In addition, the AIG 60 is much simpler than the injectors of conventional systems, having a much reduced number of spray lines and no nozzles, the ammonia vapor being sprayed through openings in the sidewall of the spray line. The exact number of spray lines and openings is dependent on the installation specific parameters, such as the flue gas flow rate and the required rate of ammonia addition. The AIG 60 is preferably located within ten feet of the stack 22 to take advantage of the turbulence within the flue gas steam created by the "bend" formed by the blanking member/bypass flapper 34, 34' and opening 36. The turbulence further ensures that the ammonia vapor is thoroughly mixed with the flue gas. Analysis has shown that sufficient ammonia/flue gas mixing occurs even if the AIG 60 is located in horizontal run 46 within ten (10) feet of the stack 22. It is possible that additional analysis would show that sufficient mixing will also occur at greater distances from the stack 22. The motive force for injecting the ammonia vapor into the flue gas stream may provided by the vapor pressure of the ammonia in the ammonia source 58. As shown in Table 1, the pressure of the ammonia vapor is sufficient over a full range of expected ambient temperatures to provide the required motive force.

TABLE 1

| Ambient Temperature (° F.) | NH3 Vapor Pressure (psia) |
| --- | --- |
| 30 | 60 |
| 70 | 129 |
| 100 | 242 |

With reference to FIG. 3, the SCR segment 28 contains catalyst units 66 which remove $NO_x$. The catalyst units 66 are conventional units, each having nominal dimensions of three feet—three inches by six feet—six inches (3.25'×6.5'). As shown in FIG. 3, upper and lower groups 68, 70 of catalyst units 66, each including one to eight units 66, may be positioned within the SCR segment housing 72. Intermediate support rails 74 carry the weight of the upper group 68 of catalyst units 66, while allowing the flue gas/ammonia vapor mixture to access all of the catalyst units 66 contained within the SCR segment housing 72. If only three catalyst units 66 are required to remove the $NO_x$, a blanking mechanism 76 may be included in the SCR segment 28 to selectively block half of the catalyst units 66. Such a blanking mechanism 76 may comprise one or more flappers 77, 77' which each have a single side edge pivotally mounted to opposite inside surfaces of the housing 72. Initially, flapper 77 is in the vertical, open position (allowing flow through the catalyst units 66 disposed under flapper 77) and flapper 77' is in the horizontal, closed position (preventing flow through the catalyst units disposed under flapper 77'). As the catalyst units 66 disposed under flapper 77 become depleted, flapper 77' is repositioned to the vertical, open position (allowing flow through the catalyst units 66 disposed under flapper 77'). Flapper 77 may be repositioned to the closed position. Alternatively, flapper 77 may remain in the open position, to allow use of any residual $NO_x$ removal capability of the catalyst units 66 disposed thereunder. If it is expected that flapper 77 will never be positioned in the close position, only flapper 77' need be installed.

Alternatively, the SCR segment 28 may contain upper and lower groups 68, 70 of two catalyst units 66 or a single layer of one to eight catalyst units 66, depending on the amount of $NO_x$ which must be removed and other application specific considerations. If space permits, and if other pollutants (e.g. CO, hydrocarbons, etc.) must be removed from the flue gas, catalyst units 78 targeting such other pollutants or catalyst units 80 removing $NO_x$ plus such other pollutants may be included in the SCR segment 28. Alternatively, the housing 82 located above the SCR segment 28 may be converted into a second SCR segment to provide for removing additional $NO_x$ and/or other pollutants.

As noted above, the emission treatment system 10 may be installed without significantly interrupting use of the ethylene-cracking furnace 12 by eliminating the need to make major modifications to the stack 22. The impact on the plant is further reduced by the modular construction of the major component module 26. The major component module 26 includes upper, middle and lower sub-modules 84, 85, 86. The lower sub-module 86 includes the ID fan 32, an outlet transition piece 88, and power and controls boxes (not shown), all of which are mounted on a base plate 90. The middle sub-module 85 includes the heat exchange segment 30. The upper sub-module 84 includes the SCR segment 28 and the inlet transition piece 42. Each of the sub-modules 84, 85, 86 is sized to fit on a conventional flat-bed tractor trailer.

With reference to FIGS. 5–8, installation of the emission treatment system 10 is a relatively simple process, providing for a low on-site construction time and minimal disruption of normal refinery activities. A number of activities are required take place in preparation 92 for the arrival of the major component module 26. The installation site of the major component module 26 must be selected 94 and an appropriate foundation installed 96 at such installation site. The location of the flue gas take-off and return openings 36, 38 must be determined 98. The heat exchanger take-off and return must be identified 100. Sources for the ammonia vapor, electric power, and control air (if needed) must be identified 102, 104, 106. Finally, all control system interfaces must be identified 108. It should be appreciated that the majority of these tasks may be conducted in parallel.

Figure 7A:
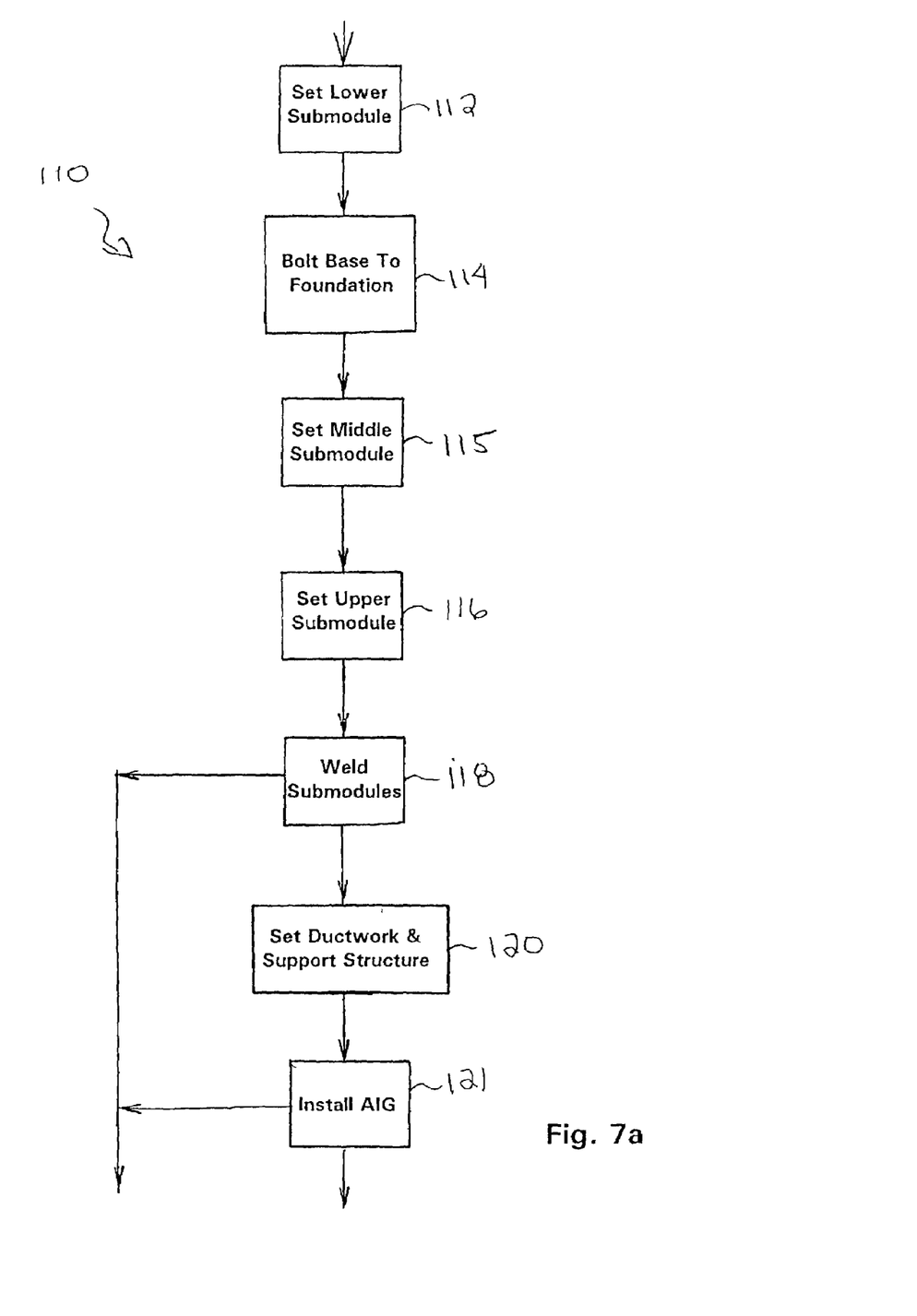
FIGS. 7a and 7b are a flow diagram of the initial installation sub-steps of the method of FIG. 5.
Figure 7B:
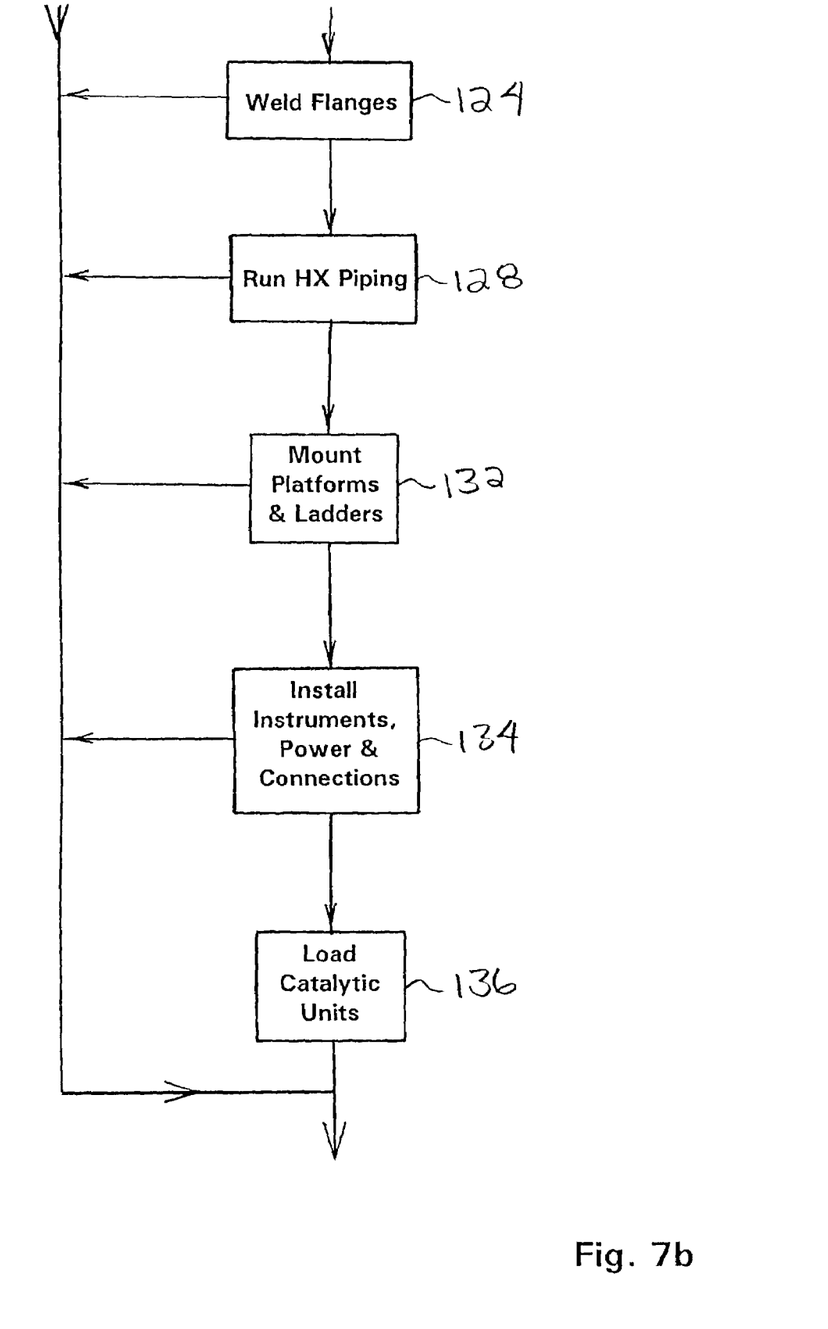
Figure 8:
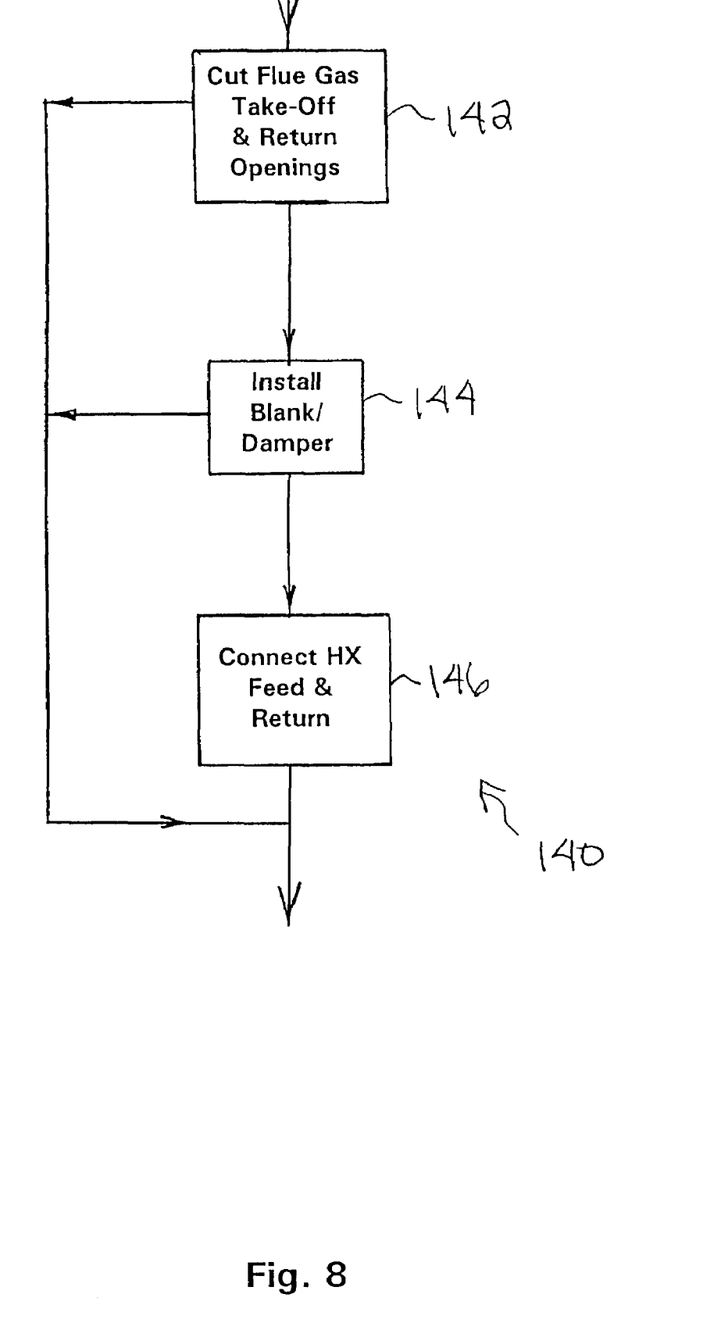
FIG. 8 is a flow diagram of the tie-in outage sub-steps of the method of FIG. 5.

Initial installation 110 begins by setting 112 the lower sub-module 86 on the foundation with a crane and securing 114 the base plate 90 to the foundation with anchor bolts (not shown). The crane is then used to set 115 the middle sub-module 85 on top of lower sub-module 86, set 116 the upper sub-module 84 on top of middle sub-module 85 and the three sub-modules 84, 86 are welded 118 together. The crane is then used to set 120 the inlet and outlet ductwork 40, 44 in place, along with its appropriate support structure, and the ductwork 40, 44 is connected to inlet transition piece 42 and outlet transition piece, respectively. The ammonia injection grid (AIG) 60 is installed 121, including connection to the ammonia vapor source 58. Connecting flanges 122 are welded 124 to the stack 22 at the location where the flue gas take-off and return openings 36, 38 will be cut, but openings 36 and 38 are not cut at this time. Interconnecting piping 126 is run 128 between the new heat exchanger segment 30 and the heat exchanger take-off and return and connected to heat exchanger segment 30. Using the crane again, platforms and ladders 130 are mounted 132 to the major components module 26. The instrumentation is installed and the ammonia vapor feed, electric power, control, and instrumentation connections are installed 134 with the corresponding system devices. The catalyst units 66 are loaded 136 in the SCR segment 28. Commissioning and pre-start procedures are conducted 138. During a scheduled tie-in outage 140, the flue gas take-off and return openings 36, 38 are cut 142, the blank/damper 34, 34' is installed 144 within the stack 22, and the heat exchanger feed and return lines 126 are connected 146 to the heat exchanger segment 30 and the take-off and the return. Finally, the ethylene-cracking furnace 12 and emission treatment system 10 are started-up 150.

Figure 9:
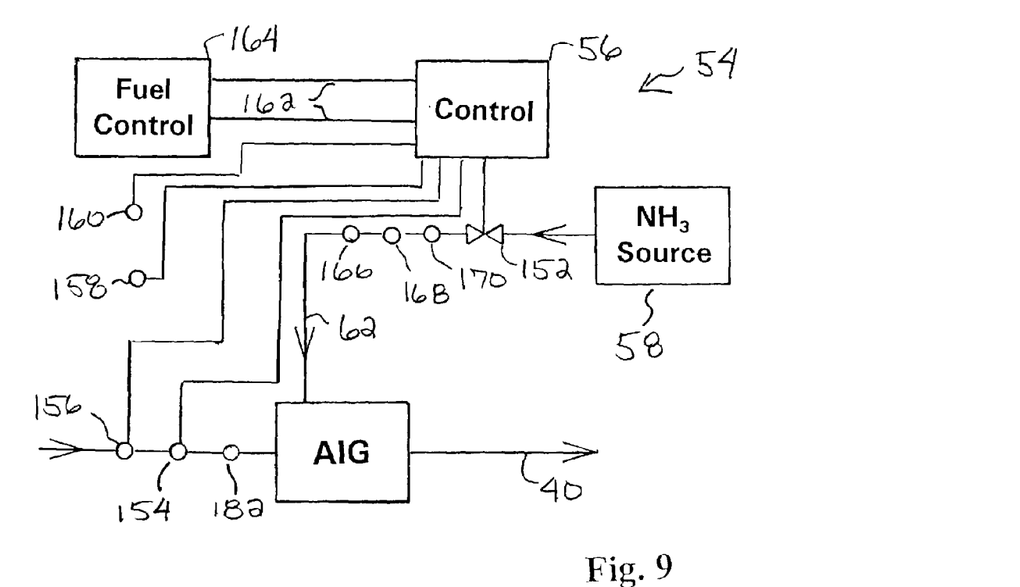
FIG. 9 is a simplified, schematic view of the ammonia addition subsystem.

As discussed above, the motive force for injecting the ammonia vapor into the flue gas stream is provided by the vapor pressure of the ammonia in the ammonia source 58. With reference to FIG. 9, a throttle valve 152 in ammonia vapor pipe 62 controls the flow of the ammonia vapor into the AIG 60. Preferably, valve 152 is controlled by the controller 56 on the basis of the flue gas flow rate, the amount of $NO_x$ entering the emission treatment system 10, and the amount of $NO_x$ exiting the emission treatment system 10. A flow sensor 154 positioned upstream of AIG 60 and $NO_x$ detectors 156, 158 located upstream of AIG 60 and at the outlet of fan 32, respectively, provide the necessary inputs to controller 56 to control ammonia addition in this manner. Alternatively, ammonia addition may be controlled on the basis of ammonia carry-over or slip. For control in this manner, an ammonia sensor 160 may be positioned at the outlet of fan 32. In still another alternative, ammonia addition may be controlled on the basis of the fuel flow to the burners 14 and the composition of such fuel.

Interconnections 162 may be provided between controller 56 and the fuel control 164 of the furnace 12 to control in this manner. Ammonia vapor flow may be monitored by pressure, temperature and flow detectors 166, 168, 170 disposed in ammonia vapor pipe 62.

Figure 10:
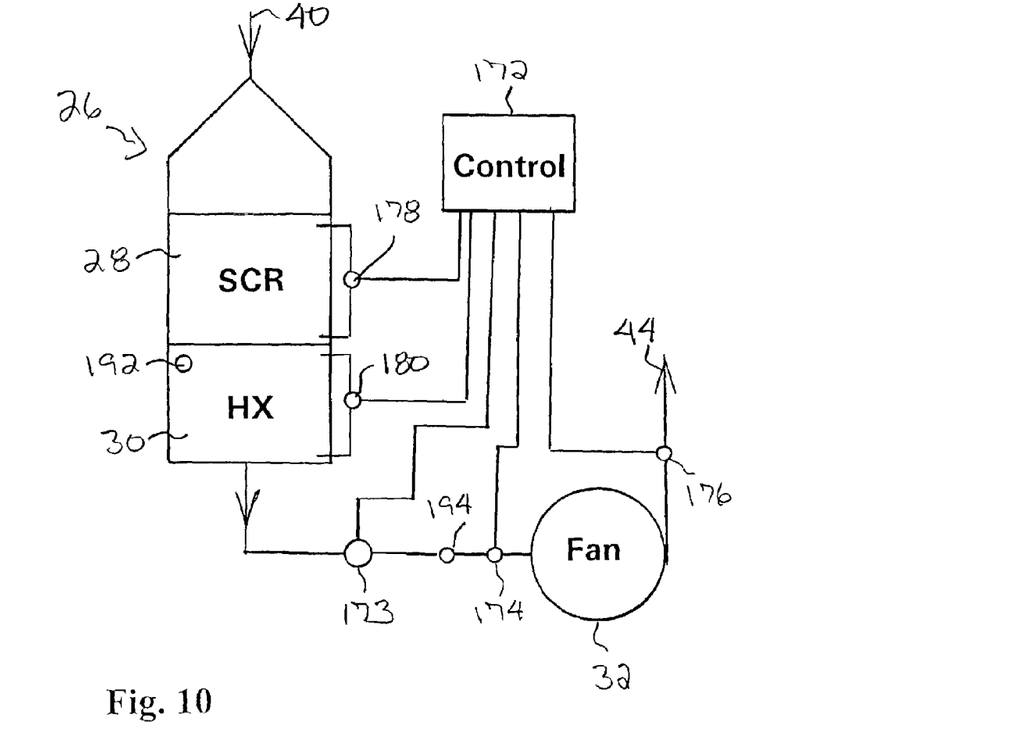
FIG. 10 is a simplified, schematic view of the fan control system.

With reference to FIG. 10, proper flow of the flue gas through the emission treatment system 10 is maintained by a controller 172 which controls the position of a damper 173 in the inlet of fan 32 on the basis of the fan supply pressure, the fan discharge pressure, the differential pressure across SCR 28, and the differential pressure across heat exchanger 30. Pressure detectors 174, 176 at the inlet and outlet of fan 32, respectively, and differential pressure detectors 178, 180 on SCR 28 and heat exchanger 30, respectively, provide necessary inputs to controller 172. The temperature of the flue gas stream may be monitored by a temperature detector 182 positioned upstream of AIG 60 (FIG. 9).

Figure 11:
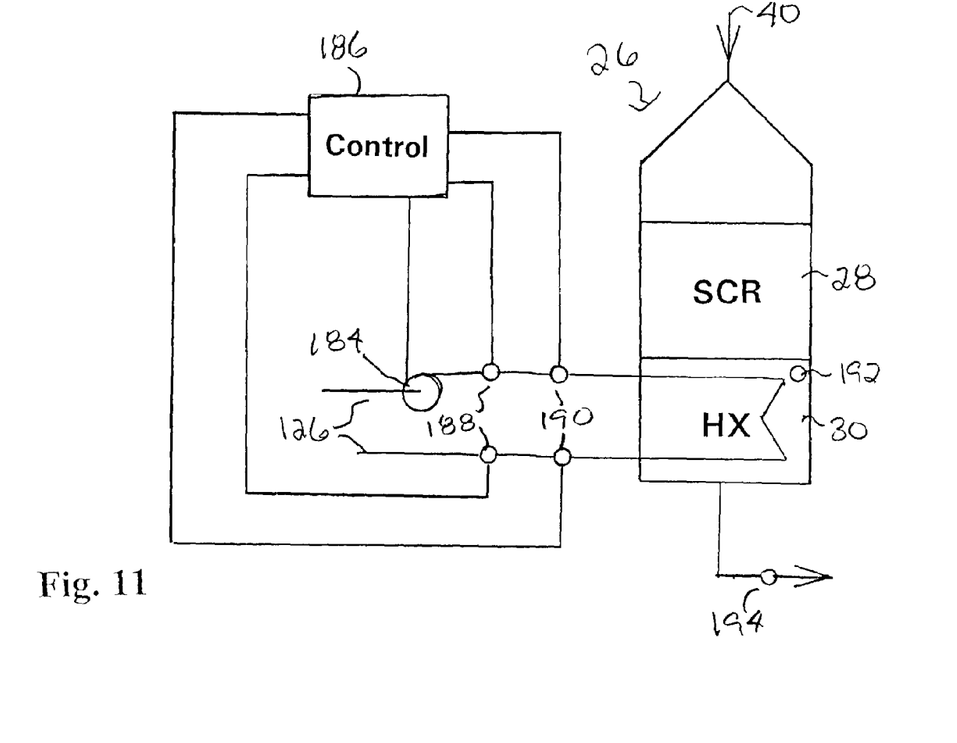
FIG. 11 is a simplified, schematic view of the heat exchanger coolant control system.

With reference to FIG. 11, a feed pump 184 in the heat exchanger feed and return lines 126 controls the flow of the boiler feedwater through heat exchanger 30. The speed of pump 184 is controlled by a controller 186 on the basis of the boiler feedwater pressure and temperature. Pressure sensors 188 and temperature sensors 190 positioned in the boiler feedwater inlet and outlet of the heat exchanger 30 provide the necessary inputs to controller 56 to feedwater flow in this manner. Temperature detectors 192, 194 in the flue gas stream upstream and downstream of heat exchanger 30, respectively, allow the efficiency of the heat exchanger 30 to be monitored.

The emission treatment system 10 described above is intended for use in treating flue gas having little or no sulfur. If sulfur is present or expected to be present in the flue gas, such sulfur must be removed before the flue gas enters the SCR segment 28. The major components module 26 is also described above as a vertical system. The benefit of such a vertical system is that it reduces the size of the foot print required for installing the module 26. However, if the foot print size is not a concern, the major components module 26 may be installed as a horizontal system, thereby providing easier access to the SCR and heat exchange segments 28, 30.

Many ethylene-cracking furnaces 12 have relied on "first generation" low $NO_x$ burners to reduce $NO_x$ emissions to levels which were acceptable under the old emissions standards. However, newer "second generation" low $NO_x$ burners must be used to attain levels which are acceptable under the new emissions standards. The second generation low $NO_x$ burners adversely affect the efficiency of the furnace 12 due to the different flame shape and heat distribution produced by such burners, compared to first generation low $NO_x$ burners. It should be appreciated that the use of the emission treatment system 10 allows the continued use of the first generation low $NO_x$ burners, thereby maintaining the ethylene-cracking furnace 12 at peak efficiency. In addition, burner control systems may be used which optimize burner efficiency.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An emission treatment system for removing $NO_x$ from flue gas emitted through an outlet end of a vertically extending stack from one or more burners disposed at an inlet end of the stack, the system comprising:

a diversion member disposed in the stack and adapted for closing the stack at a position intermediate the inlet and outlet ends;

a major component module including a first sub-module having an inlet and an SCR segment, at second sub-module having a heat exchange segment, and a third sub-module having an ID fan and an outlet, each of the sub-modules having a size and weight within size and weight limitations or a conventional flat-bed tractor trailer, the second sub-module being mountable between the first and third sub-modules, whereby the major component module defines a flue gas flow path extending from the inlet of the first sub-module to the outlet of the third sub-module;

inlet ductwork adapted for providing a passageway from the stack to the inlet of the first sub-module, the inlet ductwork being attached to the stack at a position intermediate the inlet end of the stack and the diversion member;

outlet ductwork adapted for providing a passageway from the outlet of the third sub-module to the stack, the outlet ductwork being attached to the stack at a position intermediate the diversion member and the outlet end of the stack; and an ammonia addition subsystem adapted for injecting ammonia vapor into the inlet ductwork.

2. The emission treatment system of claim 1 wherein the diversion member is a blanking member.

3. The emission treatment system of claim 1 wherein the diversion member is a bypass flapper.

4. The emission treatment system of claim 1 wherein the inlet ductwork includes a substantially horizontal run, a substantially vertical run, and an elbow disposed therebetween.

5. The emission treatment system of claim 4 wherein the elbow includes at least one moveable vane disposed therein.

6. The emission treatment system of claim 4 wherein the ammonia addition subsystem includes an ammonia injection grid disposed within the horizontal run.

7. The emission treatment system of claim 6 wherein the ammonia injection grid is positioned within ten feet of the stack and the ammonia addition subsystem does not include a mixer or diffuser.

8. The emission treatment system or claim 6 wherein the ammonia addition subsystem does not include any dilution air blower, blower control, or ducting.

9. The emission treatment system of claim 6 wherein the ammonia addition subsystem also includes a source of ammonia vapor the source of ammonia vapor containing a quantity of ammonia, the vapor pressure of the ammonia providing a motive force for injecting the ammonia vapor into inlet ductwork.

10. The emission treatment system of claim 9 wherein the ammonia addition subsystem further includes an ammonia vapor pipe providing fluid communication between the source of ammonia vapor and the ammonia injection grid, a throttle valve disposed in ammonia vapor pipe, and an ammonia vapor addition controller for controlling the throttle valve.

11. The emission treatment system of claim 10 further comprising a flue gas flow sensor and an inlet $NO_x$ detector positioned intermediate the stack and the ammonia injection grid and an outlet $NO_x$ detector positioned intermediate the ID fan and the stack, each of the detectors being in electrical communication with the ammonia vapor addition controller.

12. The emission treatment system of claim 10 further comprising an ammonia sensor positioned intermediate the ID fan and the stack in electrical communication with the ammonia vapor addition controller.

13. The emission treatment system of claim 10 wherein the burner includes a fuel controller and the ammonia vapor addition controller is adapted for communicating with the fuel controller.

14. The emission treatment system of claim 1 wherein the SCR segment includes a housing having first and second oppositely disposed inner surfaces, a plurality of catalyst units disposed within the housing, and a first flapper having a side edge pivotally mounted to the first inner surface, the first flapper being moveable between open and closed positions, the first flapper being adjacent to the first inner surface in the open position and extending over substantially a first half of the catalyst units in the closed position, at least one of the catalyst units being composed of materials for selectively catalyzing $NO_x$.

15. The emission treatment system of claim 14 wherein the SCR segment also includes a second flapper having a side edge pivotally mounted to the second inner surface, the second flapper being moveable between open and closed positions, the second flapper being adjacent to the second inner surface in the open position and extending over substantially a second half of the catalyst units in the closed position.

16. The emission treatment system of claim 14 wherein at least one of the catalyst units is composed of materials for selectively catalyzing pollutants other than $NO_x$.

17. The emission treatment system of claim 14 wherein at least one of the catalyst units is composed of materials for selectively catalyzing $NO_x$ and other pollutants.

18. The emission treatment system of claim 14 wherein the first sub-module also has a housing disposed intermediate the SCR segment and the inlet and at least one catalyst unit composed of materials for selectively catalyzing pollutants other than $NO_x$.

19. The emission treatment system of claim 1 wherein the first sub-module also has a differential pressure detector for detecting the differential pressure across the SCR, the second sub-module also has a differential pressure detector for detecting the differential pressure across the heat exchanger, and the third sub-module also has damper controlling flow through the ID fan, a damper controller for controlling the position of the damper and pressure detectors at the inlet and outlet of the ID fan, the differential pressure detectors and the pressure detectors being in electrical communication with the damper controller.

20. An emission treatment system for removing $NO_x$ from flue gas emitted through an outlet end of a stack from one or more burners disposed at an inlet end of the slack, the stack including a fan and a heating coil disposed therein between the inlet end and the outlet end, the system comprising:
 a diversion member disposed in the stack at a position intermediate the inlet and outlet ends;
 a major component module positioned external to the stack, the major component module including an inlet, an SCR segment, a heat exchange segment, an ID fan, and an outlet;
 inlet ductwork adapted for providing a passageway from the stack to the inlet of the major component module, the inlet ductwork being attached to the stack at a position intermediate the inlet end of the stack and the diversion member;
 outlet ductwork adapted for providing a passageway from the outlet of the major component module to the stack, the outlet ductwork being attached to the stack at a position intermediate the diversion member and the outlet end of the stack; and
 an ammonia addition subsystem adapted for injecting ammonia vapor into the inlet ductwork,
 wherein the diversion member diverts a flue gas flow path around the fan and the heating coil and through the inlet ductwork, the inlet of the major component module, the SCR segment, the heat exchange segment, the ID fan, the outlet of the major component module, and the outlet ductwork to the outlet end of the stack.

21. The emission treatment system of claim 20 wherein the diversion member is one of a blanking member and a bypass flapper.

22. The emission treatment system of claim 20 wherein the inlet ductwork includes a substantially horizontal run, a substantially vertical run, and an elbow disposed therebetween, the elbow including at least one moveable vane disposed therein.

23. The emission treatment system of claim 22 wherein the ammonia additional subsystem includes an ammonia injection grid disposed within the horizontal run.

24. The emission treatment system of claim 20 wherein the SCR segment includes a housing having first and second oppositely disposed inner surfaces, a plurality of catalyst units disposed within the housing, and a first flapper having a side edge pivotally mounted to the first inner surface, the first flapper being moveable between open and closed positions, the first flapper being adjacent to the first inner surface in the open position and extending over substantially a first half or the catalyst units in the closed position, at least one of the catalyst units being composed of materials for selectively catalyzing $NO_x$.

25. The emission treatment system of claim 24 wherein at least one of the catalyst units is composed of materials for selectively catalyzing pollutants other than $NO_x$.

26. The emission treatment system of claim 24 wherein at least one of the catalyst units is composed of materials for selectively catalyzing $NO_x$ and other pollutants.

27. The emission treatment system of claim 20, wherein the major component module comprises:
 a first sub-module including the inlet and the SCR segment;
 a second sub-module including the heat exchange segment; and
 a third sub-module including the ID fan and the outlet, each of the sub-modules having a size and weight within size and weight limitations of a conventional flat-bed tractor trailer, and the second sub-module being mountable between the first and third sub-modules.

* * * * *